United States Patent Office 3,480,484
Patented Nov. 25, 1969

3,480,484
METHOD FOR PREPARING HIGH MOBILITY INDIUM ANTIMONIDE THIN FILMS

James A. Carroll, Farmingdale, N.Y., and Joel F. Spivak, Hightstown, N.J., assignors to Loral Corporation, Scarsdale, N.Y., a corporation of New York

No Drawing. Filed June 28, 1966, Ser. No. 561,022
Int. Cl. C23c *13/02;* C23b *5/50*
U.S. Cl. 148—6.3 7 Claims

ABSTRACT OF THE DISCLOSURE

The process of forming high mobility InSb films which comprises oxidizing a flash-evaporated film of InSb followed by heating to its melting point to recrystallize the deposited oxide coated film.

The present invention relates to a process for the production of semiconductor thin films and more particularly to a process for producing thin InSb films having a high electron mobility.

The method and process of the present invention is particularly useful in the manufacture of high electron mobility thin film Hall-effect devices and the like. The problem of producing such thin films having an electron mobility comparable to that obtainable with the same materials in bulk form has long been recognized. It has been primarily attributed to the failure of being able to produce thin films (e.g. 1–5 microns thick) having a uniform, large crystalline structure throughout a relatively large surface area (e.g. 1–3 cm.$^2$).

It is a principal object of the present invention to provide a process for manufacturing relatively large area InSb thin films having a high electron mobility.

In accordance with the present invention, thin InSb films having the desired increased electron mobility factor are produced by (a) vacuum evaporating a thin film of indium and antimony on a heated substrate (b) forming a thin oxide layer on the surface of the deposited indium antimonide film and (c) recrystallizing the film by heating it to the melting point in an inert atmosphere and then allowing it to cool.

In the preferred process, pure elemental indium and antimony are evaporated from one source or boat in vacuum onto a smooth substrate, preferably being either a single crystal or of an amorphous material. The In and Sb are preferably deposited in a stoichiometric ratio at a relatively high rate (e.g. 1000 A./sec. for a film 50,000 A. in thickness) to obtain highest purity and the substrate is heated to the maximum permissible temperature during the deposition period in order to obtain maximum size crystallites in the deposited film and to also increase the diffusion rate and thereby produce a more complete compound formation. However, the substrate temperature should not be raised to a level so high as to re-evaporate either the deposited In or Sb. In practice, the optimum substrate temperature can best be determined experimentally taking into consideration, the pressure at which deposition is effected.

Excellent results have been obtained using a pressure before deposition of 2 to $5 \times 10^{-6}$ torr, a pressure during deposition of approximately $10^{-4}$ torr and a substrate temperature in the range of 250° C.–350° C. An amorphous substrate of soft glass cut from commercially available microscope slides has been found to perform very satisfactorily and to permit growth of larger film crystallites than can be obtained on polycrystalline substrates such as BeO and alumina. The small crystallite size in the BeO and alumina substrates apparently inhibits the desired growth of large crystallites in both the deposited and recrystallized films. Accordingly, the substrate should preferably comprise either an amorphous material such as glass or a single crystal.

After the film of desired thickness has been deposited on the heated substrate, a thin oxide layer is produced on the InSb surface prior to recrystallization of the entire film. In accordance with this featured aspect of the invention, the oxide layer functions to enhance adhesion of the film to the substrate surface by preventing agglomeration or balling up of the molten film during the recrystallization step. The oxide layer may be formed either by exposing the freshly deposited film to an oxidizing atmosphere while it is still hot from the evaporation step (i.e. about 250° C.) or the film may be reheated to a temperature of approximately 250° C. in an oxidizing atmosphere for a short period of time just prior to being heated to the recrystallization temperature of approximately 525° C. to 530° C. In the alternative, the oxide layer may be formed during the recrystallization process which will be described next.

In the recrystallization process, the substrate with its deposited thin film is placed in a furnace having a relatively large uniform heating zone with respect to the dimension of the deposited thin film. For films of 1 to 3 cm.$^2$, for example, a tube furnace having a uniform 10″ heating zone has been found to perform satisfactorily. In the preferred process, the films are heated to a temperature of about 525° C. to 530° C. in an atmosphere of argon for a period of approximately ten to twenty minutes. The argon gas is preferably passed over the film sample at a rate of about 4 cubic feet per hour during the recrystallization process. As indicated above, an important step in the process provided by the present invention is that of forming an oxide layer on the surface of the film which prevents rupture or balling up of the liquid film due to surface tension during the recrystallization period. As an alternative to the procedures described above, the oxide layer may be formed by allowing a trace quantity of oxygen to enter the furnace along with the argon throughout the recrystallization step.

Typically, the thin InSb film taken directly from the vacuum system can be characterized as having a small crystallite size, a milky white color and an extremely low mobility of from 1000–3000 cm.$^2$/volt-sec. Following the complete recrystallization process as described above, the film exhibits a shiny metallic surface having large crystallites and a mobility of over 40,000 cm.$^2$/volt-sec. Diffractometer scans of these high mobility films indicate there is no particular preferred crystal orientation but show strong (110), (220) and (311) InSb peaks and small peaks of $In_2O_3$.

Measurements made on a film processed in accordance with the present invention, having a net carrier concentration at room temperature of $3.2 \times 10^{16}$ impurities/cc., showed a maximum mobility of 44,000 cm.$^2$/volt-sec. at room temperature with a decreasing value at both higher and lower temperatures. With films having a net carrier concentration lowered to $10^{15}$ impurities/cc., it can be predicted that room temperature mobilities as high as 70,000 cm.$^2$/volt-sec. may be obtained with films having a thickness of no less than 3 microns.

Utilizing the above-described process, InSb films with a thickness of 3 microns or greater have been produced having a room-temperature mobility factor as high as 50,000 cm.$^2$/volt-sec. Generally speaking, it has been found that the mobility factor decreases as the film thickness decreases below 3 microns and remains substantially constant for film thicknesses of 3 microns and greater.

We claim:

1. A process for preparing high mobility InSb thin films on a supporting substrate comprising the steps of
heating said substrate,
simultaneously depositing elemental indium and antimony on said substrate by flash evaporation in a vacuum,
forming a thin oxide surface on the deposited thin film of InSb,
recrystallizing the deposited film by heating it to its melting temperature and allowing it to cool.

2. A process for preparing high mobility InSb thin films on a supporting substrate comprising the steps of
heating said substrate,
simultaneously depositing elemental indium and antimony on said substrate by flash evaporation in a vacuum,
forming a thin oxide surface on the hot freshly evaporated thin film by exposing it to an oxidizing atmosphere,
recrystallizing the deposited film by heating it to its melting temperature and allowing it to cool.

3. A process for preparing high mobility InSb thin films on a supporting substrate comprising the steps of
heating said substrate,
simultaneously depositing elemental indium and antimony on said substrate by flash evaporation in a vacuum,
forming a thin oxide surface on the deposited thin film of InSb,
recrystallizing the deposited film by heating it to its melting temperature in an inert atmosphere of argon and allowing it to cool.

4. A process for preparing high mobility InSb thin films on a supporting substrate comprising the steps of
heating said substrate,
simultaneously depositing elemental indium and antimony on said substrate by flash evaporation in a vacuum,
recrystallizing the deposited film by heating it to its melting temperature in an atmosphere containing argon and a small quantity of oxygen and allowing the film to cool to ambient temperature.

5. The process of claim 1 wherein the deposited film comprises a stoichiometric ratio of In and Sb.

6. The process of claim 1 wherein the InSb film is deposited and supported on an amorphous substrate.

7. The process of claim 1 wherein the InSb film is deposited and supported on a single crystal substrate.

References Cited

UNITED STATES PATENTS

| | | | |
|---|---|---|---|
| 2,759,861 | 8/1956 | Collins et al. | 117—201 X |
| 2,938,816 | 5/1960 | Gunther | 117—201 X |
| 2,994,621 | 8/1961 | Hugle et al. | 117—201 |
| 3,082,124 | 3/1963 | French et al. | 117—201 X |
| 3,101,280 | 8/1963 | Harrison et al. | 117—106 X |

OTHER REFERENCES

German Auslegeschrift 1,041,582, October 1958, Bierman et al.

Zeitschrift fur Naturfurschung, vol. 2, No. 13*a*, pp. 148–152, February 1958.

WILLIAM L. JARVIS, Primary Examiner

U.S. Cl. X.R.

117—62, 106, 118, 201, 215, 229